Feb. 5, 1929. 1,701,047
B. M. LEECE
GENERATOR
Filed Jan. 1, 1926   2 Sheets-Sheet 1

Inventor.
Bennett M. Leece
Kwis Hudson & Kent
Attys

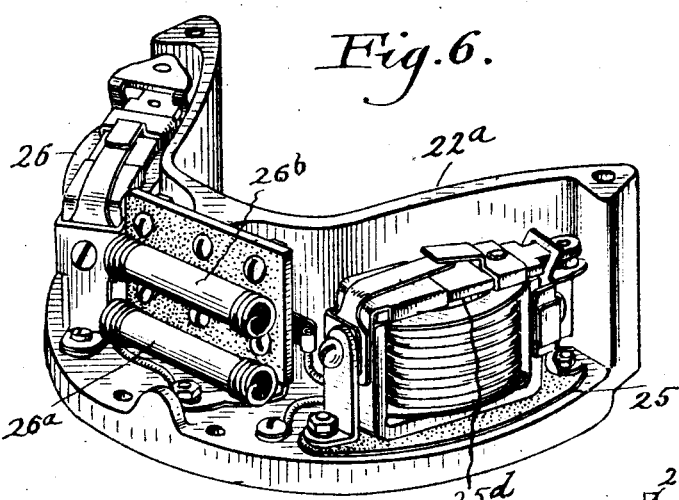
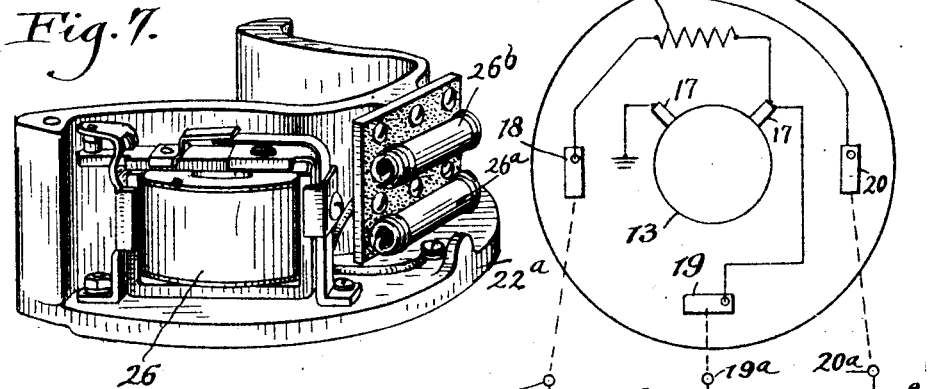
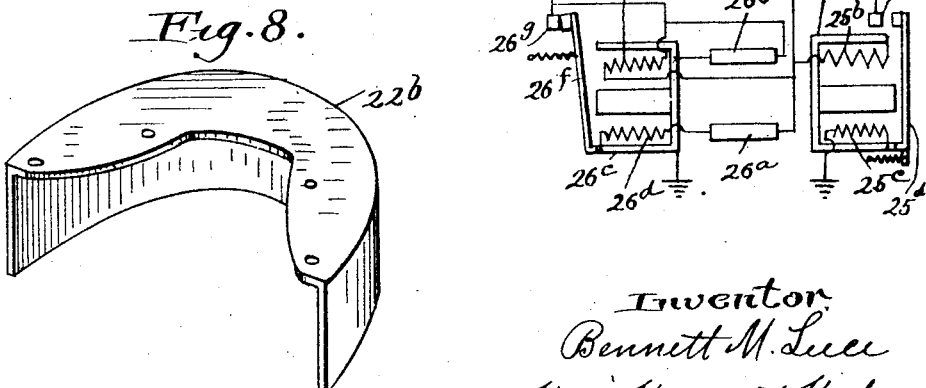

Patented Feb. 5, 1929.

1,701,047

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

GENERATOR.

Application filed January 1, 1926. Serial No. 78,725.

This invention relates to generators adapted particularly for lighting and battery charging systems of variable speed motor driven vehicles such as automobiles and the like.

More particularly the invention relates to the disposition and manner of mounting the controlling devices that the system requires, such, for example, as the voltage or current regulators, or both, and the reverse current cut-out, as well as the resistance member or members which may be employed in connection with one or more of these controlling devices.

The principal object of the invention is to arrange and support these controlling devices in a removable receptacle or casing which is adapted to be applied to the machine in such a way as to leave no protruding parts, and so as not to break the line of the machine, which is generally cylindrical in form, and at the same time apply these parts and the casing therefor in an unoccupied space so as to avoid adding to the dimensions of the machine, and to realize to a greater extent than heretofore, the feature or element of compactness.

Still further the invention aims to simplify the electrical connections by reducing the number of outside terminals of the generator, and to so arrange the parts that the necessary electrical connections between the controlling device or devices and the generator proper are all made when the casing for the controlling devices is applied to the machine.

The invention may be briefly summarized as consisting in certain novel details of construction, and combinations and arrangements of parts which will be described in the specification and set forth in the appended claims.

Figure 1:
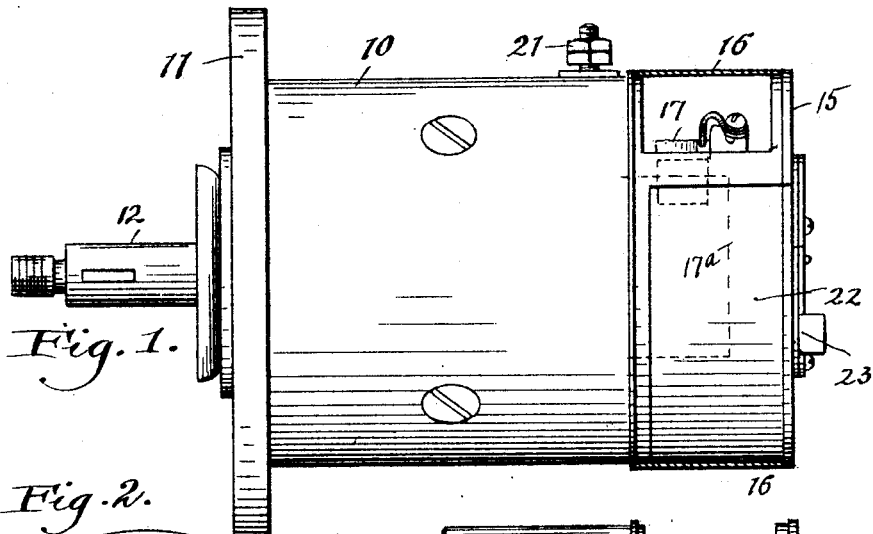
Figures 2, 3:
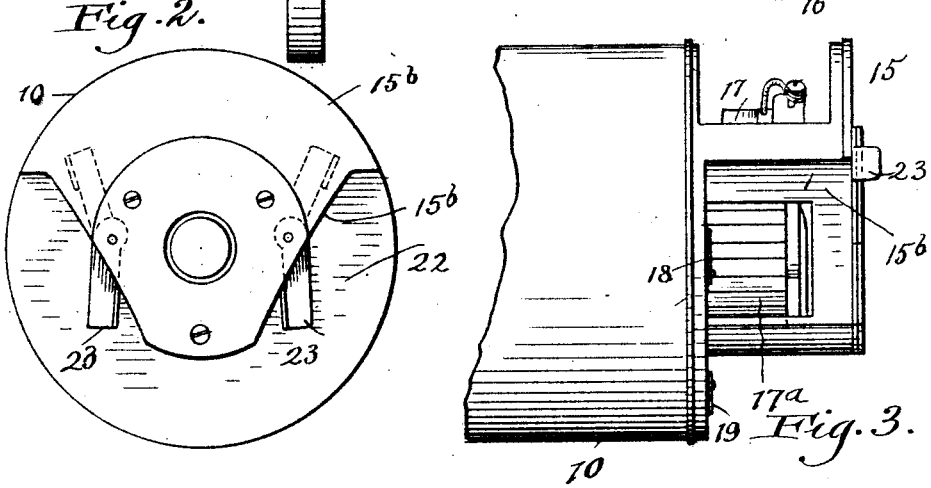
Figures 4, 5:
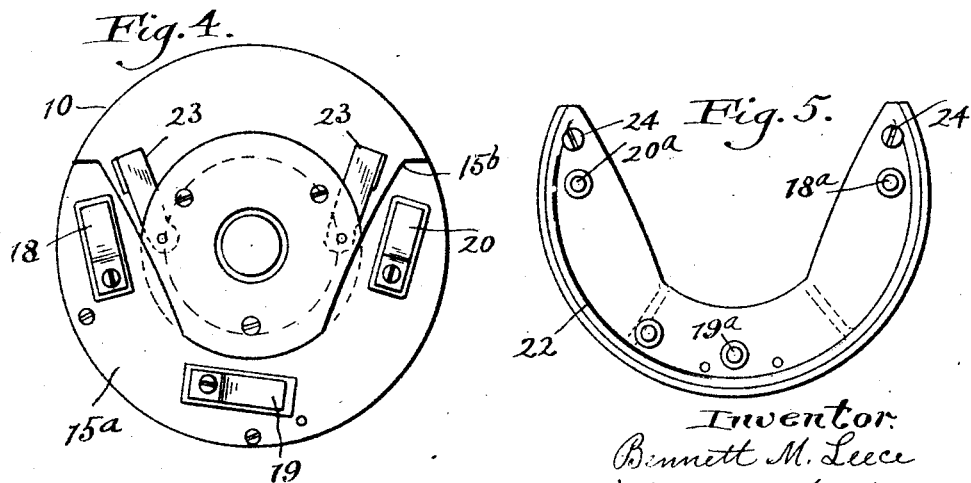

In the accompanying sheets of drawings, Fig. 1 is a side view of the generator equipped with my invention, the band, which encircles the commutator, the brushes and the removable casing for the controlling devices, being in section; Fig. 2 is an end view of the generator looking toward the right hand end of Fig. 1; Fig. 3 is a side elevation of the commutator end of the machine with the casing and the controlling devices removed; Fig. 4 is an end view looking toward the right hand end of Fig. 3, and showing on the end face of the generator certain connection springs used in making the electrical connections when the casing is applied; Fig. 5 is a side view of the casing for the controlling devices removed, the side shown being the inner side with connection plugs or pins adapted to engage the connection springs of Fig. 4; Fig. 6 is a perspective view of the casing with the cover thereof removed so as to show the controlling devices therein; Fig. 7 is a similar view showing certain parts not clearly seen in Fig. 6; Fig. 8 is a perspective view of the cover of the casing on a slightly reduced scale; and Fig. 9 is a diagrammatic view showing the electrical connections made when the casing is applied to the end of the generator.

The generator includes a housing 10 which is preferably and generally cylindrical in form, and is provided at one end with an end plate 11, having a bearing for shaft 12, the end plate having in this instance a flange by which the generator may be secured in place. The details of the generator, particularly in so far as the enclosed parts are concerned, are immaterial to the present invention, and are therefore not illustrated except conventionally in Fig. 9, where the armature is designated 13 and the field winding 14, a shunt machine being in this case illustrated.

At the commutator end of the machine there is a more or less skeleton frame 15 adapted to receive an enclosing band 16 shown in section in Fig. 1. This frame supports the holders for the brushes 17, one of which is indicated in Fig. 1, and carries one of the shaft bearings.

The frame 15 is of irregular shape, there being an annular portion 15$^a$ (see particularly Fig. 4) which is secured to the adjacent end of the housing 10, and a substantially V-shaped protruding portion 15$^b$ which partly encloses the commutator 17$^a$ though it is open so that access can be had to the brushes and to the commutator. On the face of the flat annular portion 15$^a$ (see particularly Fig. 4) are three contact springs 18, 19 and 20, these springs being designed to co-operate with contact pins on the casing or receptacle for the controlling devices, to be referred to presently, to make the electrical connections therewith. One of these springs, namely, spring 18, is connected to the field winding 14 (see Fig. 9); spring 19 is connected to one of the brushes 17, and the other spring is connected to a terminal 21 shown in Figs. 1 and 9, it being a feature of the present invention that only one outside terminal is required, this being adapted to be connected to one side of the battery or load circuit, the other side of which will be grounded, inasmuch as one of the brushes is grounded, as indicated in Fig. 9.

As stated above, the frame 15 has a more or less V-shaped protuberance 15$^b$ which extends axially of, and partly surrounds the commutator. This leaves beneath and on opposite sides of the V-shaped protuberance, a substantially U-shaped depression which is adapted to receive and to be filled by a U-shaped casing or receptacle 22, shown detached in Fig. 5, and when this casing is applied to the end of the generator it is complementary to the V-shaped protuberance 15$^b$ forming therewith the annular end of the machine. This casing 22, together with the upper part of protuberance 15$^b$ is adapted to be enclosed by the band 16 shown in Fig. 1, and the casing is preferably held in place, not only by the band 16, but by pivoted clips 23 which when swung to inoperative position as shown in Fig. 4, will permit the casing to drop or to be lifted out of place, and when swung to the position shown in Fig. 2 they snap over slight projections on the outer side or face of the casing, and hold it in position, when the band 16 is removed. When this U-shaped casing is applied to the end of the machine as indicated in Figs. 1 and 2, three connection pins, 18$^a$, 19$^a$, and 20$^a$, extending through the flat inner side of the casing, engage the springs 18, 19 and 20, so as to make the necessary electrical connections between the conductors in the generator and the controlling devices in the casing.

The casing 22 includes a main or body portion 22$^a$ and a removable cover 22$^b$ adapted to be held in place by a pair of screws 24. In the casing are mounted the controlling devices, which in this instance include the reverse current cut-out 25 and a voltage regulator 26. The casing carries a pair of resistance members 26$^a$ and 26$^b$ which are associated with the voltage regulator and may be considered a part thereof.

The details of the reverse current cut-out are immaterial to the invention, and it will be sufficient to state that the cut-out includes the usual magnet frame 25$^a$ (see Fig. 9), a series coil 25$^b$, a shunt coil 25$^c$, an armature 25$^d$ which as usual is biased toward open position, and the contacts 25$^e$, at which the load circuit is adapted to be opened and closed so as to prevent the battery discharging through the generator when the voltage of the latter is less than that of the battery.

The details of the voltage regulator may also be varied materially, but in this instance it includes a magnet frame 26$^c$, two coils 26$^d$, and 26$^e$, a vibratory armature 26$^f$ which is biased toward closed position, and contacts 26$^g$ which as they open and close cut into and out of the field circuit the resistance member 26$^b$ and also change the current flow through coil 26$^e$, the other resistance member when employed being constantly in series with one of the coils of the voltage regulator. These controlling devices are securely mounted on the body portion 22$^a$ of the casing 22, and the parts may be connected together and to the connection pins 18$^a$, 19$^a$, and 20$^a$, as indicated in Fig. 9, so that these controlling elements will be properly connected to each other and to the internal parts of the generator to function in the intended and usual manner when the casing is applied to the end of the machine.

It will be noted by reference to Fig. 9, that when the casing 22 containing the controlling devices is applied to the machine, the load and reverse current cut-out circuits are as follows: from one of the brushes 17 to connection spring 19, to connection pin 19$^a$, through the series coil of the cut out to the magnet frame thereof, armature 25$^d$, contacts 25$^e$, connection pin 20$^a$, connection spring 20, terminal 21, through the load circuit to ground, and to the other brush 17. The shunt coil 25$^c$ of the cut-out is connected from the frame of the magnet to ground, and therefore across the terminals of the machine.

The connections for the voltage regulator are as follows: from one of the brushes 17 to connection spring 19, to connection pin 19$^a$, through resistance element 26$^a$, through coil 26$^d$ to ground, and therefore to the other brush 17. Also through coil 26$^e$ and across the contacts 26$^g$ when they are closed, and to ground, or through the resistance member 26$^b$ to ground when the contacts are open. It will be understood that the specific connections described are not essential to the invention, the connections described being easily made and being such as used by me in practice and being the same or substantially the same as illustrated and described in my prior Patent No. 1,633,671, granted June 28, 1927.

It will be seen from the above that the controlling devices are all arranged in a single removable casing or receptacle which can be readily applied to the machine, and when applied, the necessary electrical connections are made with the generator. In case repairs or adjustments are desired, the casing can be easily and quickly removed for that purpose. Furthermore, it will be noted that by arranging the controlling devices in a casing such as herein illustrated and described and applied at the commutator end of the machine around the commutator beneath the brushes, it occupies what would otherwise be an unused space, and therefore does not add to the dimensions of the machine nor break the cylindrical lines of the generator, thus adding materially to the appearance and desirability of the machine in view of its compactness and almost complete absence of projecting parts liable to injury and breakage. Additionally the connections between the generator and battery or load circuit are simplified to the maximum extent, since the generator has simply one outside terminal.

While I have shown the preferred construction, and while the controlling devices which are arranged in the removable unit consist of a cut-out and a voltage regulator, I do not desire to be confined to the precise details shown, nor to the precise controlling devices which in this instance are contained in the unit, but aim in my claims to cover all modifications and changes which do not involve a departure from the spirit and scope of the invention as defined in the appended claims.

Having described my invention, I claim:

1. In combination, a generator comprising a field frame provided with end members, a rotor supported by said end members, one of said end members being provided with a recessed portion, and a casing containing one or more controlling devices fitted and secured within said recessed portion and having means for making the necessary electrical connections with the generator.

2. A generator comprising a field frame having end members and a rotary member including a commutator supported in said end members, brushes in engagement with one portion of said commutator, and a casing containing one or more controlling devices secured to one of said end members and extending around the other portion of said commutator, said casing having means for making the necessary electrical connections with parts of the generator on the interior of the frame.

3. A generator comprising a field frame and a rotary member including a commutator, and a casing containing one or more controlling devices secured to the end of the frame adjacent the commutator and extending part way only around the latter.

4. A generator comprising a field frame and a rotary member including a commutator, said field frame having an end member with a protuberance occupying a portion of the space around said commutator, and a casing containing one or more controlling devices which are adapted to be connected to the generator, said casing occupying the remainder of the space around said commutator and being secured to said end member of the field frame.

5. A generator comprising a field frame and a rotary member including a commutator with brushes engaging the same, a substantially U-shaped casing at one end of the frame and extending part way around the commutator beneath the brushes, and controlling devices in said casing adapted to be connected to parts of the generator when the casing is applied.

6. A generator comprising a field frame and a rotary member including a commutator, said field frame having an annular end portion surrounding the commutator and composed in part of a fixed member and a removable casing, controlling devices in the casing, and cooperating contacts by which the controlling devices are connected to parts on the interior of the generator when the casing is applied.

7. A generator comprising an annular field housing and a skeleton frame member at the commutator end thereof, a rotary member including an armature and commutator, and a substantially U-shaped casing extending part way around the commutator and containing circuit controlling devices for the generator, said skeleton frame member having contact members connected to parts on the interior of the generator housing, and the casing having co-operating contact members connected to certain of the controlling devices therein, whereby electrical connections between the controlling devices and the generator are established when the casing is applied.

8. A generator comprising an annular field housing and a skeleton frame member at the commutator end thereof, a rotary member including an armature and commutator, a substantially U-shaped casing extending part way around the commutator and containing circuit controlling devices for the generator, said skeleton frame member having contact members connected to parts on the interior of the generator housing and the casing having co-operating contact members connected to certain of the controlling devices therein, whereby electrical connections between the controlling devices and the generator are established when the casing is applied, and a removable band encircling the skeleton frame member and casing.

In testimony whereof, I hereunto affix my signature.

BENNETT M. LEECE.